Sept. 18, 1962 P. E. KING ET AL 3,054,651
CONVERTIBLE CLASSROOM DESK
Filed Feb. 25, 1959 2 Sheets-Sheet 1
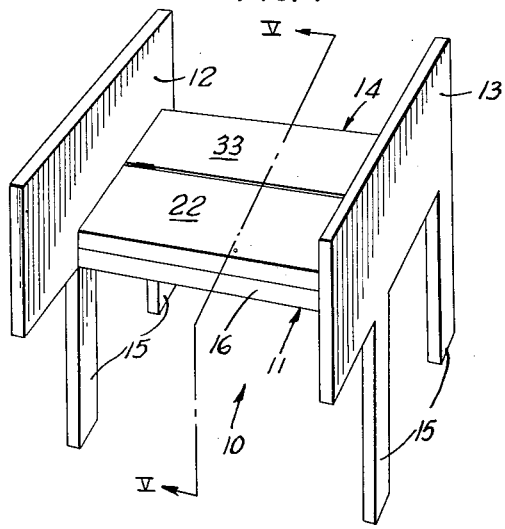
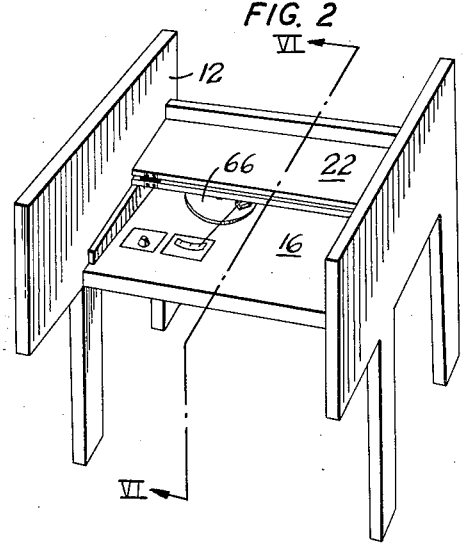
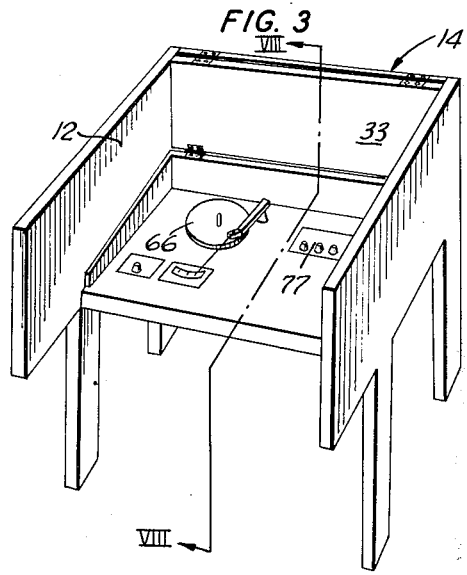
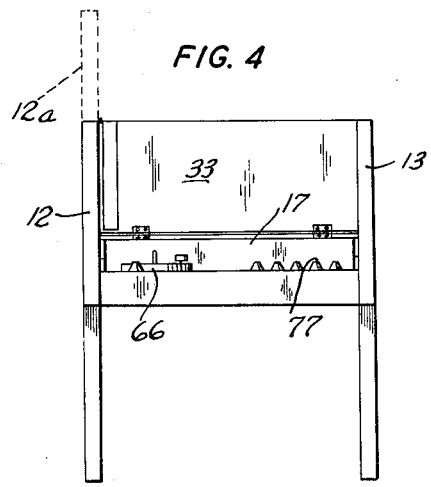
INVENTORS Paul E. King
Rudolph F. Mallina INVENTORS Paul E. King
Rudolph F. Mallina United States Patent Office 3,054,651
Patented Sept. 18, 1962

3,054,651
CONVERTIBLE CLASSROOM DESK
Paul E. King, New York, and Rudolph F. Mallina, Hastings on Hudson, N.Y., assignors to Thompson Ramo Wooldridge Inc., Cleveland, Ohio, a corporation of Ohio
Filed Feb. 25, 1959, Ser. No. 795,562
3 Claims. (Cl. 312—239)

The invention relates to a student desk which can be used for the purpose of conventional classroom teaching and also for teaching foreign languages by the laboratory method.

The teaching of foreign languages in the United States of America is now being done more and more by machine. The reason for a special desk is due to the fact that each student participtates during the lesson by repeating the words coming to him from the master machine. In order to give each student a certain amount of privacy and to separate him acoustically from his neighbors, it is customary now to make students' desks with a partial enclosure. The common name for such a desk, in the language of educators, is "booth."

High schools and universities use rooms equipped with specially designed booths for language instruction only. These rooms are known as "language laboratories." Sometimes these rooms are used for only a few hours each day. Since such partial occupation of the classroom is uneconomical there is now a demand for a simple booth which can be used both for language study and ordinary classroom work.

Several requirements are specified by schools which need desks serving two purposes: For ordinary classroom use the instrumentalities, such as switching panel, phonograph, recorder, earphones, and microphones, must be covered and out of reach when not in use. Furthermore, the classroom student should have before him nothing but a flat table top. A partition between adjacent students is not objectionable for ordinary classroom use but there must not be a partition in front of the classroom student. The language student, however, needs a front partition. Its purpose is to separate him acoustically from the student in front of him. The partition between students in a sidewise direction has advantages in both the language laboratory and the conventional classroom. In the laboratory the student feels less inhibited when speaking into the microphone; in the classroom he is effectively prevented from conversing with his neighbor.

To satisfy the languagage teacher the student should have a free visual path to the teacher, the blackboard, and the screen but he should also have acoustical privacy. It is fortunate that the student's visual path is always in an upward direction whereas the acoustical path is in a downward direction. In other words, when the student looks at the teacher he looks upwards; when he looks at the book and speaks into the microphone the direction of speech is downwards. Most of the acoustic power is thereby dissipated in the acoustically treated walls. In some cases it may be necessary to have more acoustical separation than can be obtained with a partition whose upper edge is at eye level. In that case the side wall also has a foldable feature.

To make the combination desk a practical piece of furniture in the school, the conversion from a classroom desk to a language booth must be a simple operation. It should be neither time consuming nor complicated. A desk of this type must also be relatively inexpensive, sturdy, and safe. The invention disclosed hereinafter describes such a desk of FIGURE 1.

An object of the invention is to cover the instrumentalities used in the language laboratory and thereby provide the classroom student with a desk top which is flat and free from all mechanisms.

A more specific object is to make the conversion of the desk from classroom use to laboratory use a simple operation.

On the drawing:

FIG. 1 is a view in perspective of a convertible desk constructed in accordance with the principles of this invention and shown arranged as when used in the ordinary classroom;

FIG. 2 is a view of the desk which shows the front portion of the top folded back 180 degrees on to the back portion;

FIGURE 3 shows the desk of FIGURE 1 transformed into a language both;

FIGURE 4 is a front view of the desk of FIGURE 1 with the table top in its upright position;

As shown on the drawings:

Figure 5:
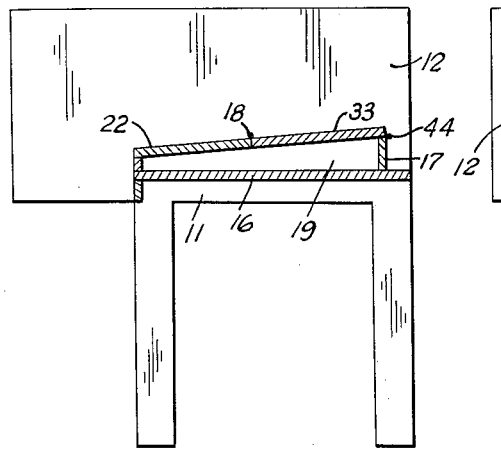
FIGURE 5 is a cross-sectional view taken along line V—V of FIGURE 1.

The principles of this invention are particularly useful when embodied in a device which is convertible from a classroom desk to a language booth, such as shown in FIGURE 1, generally indicated by the numeral 10. In this figure, the device 10 is arranged as a classroom desk. The desk or device 10 includes a support structure generally indicated at 11, a pair of upright side partitions or side walls 12 and 13, and a foldable table top generally indicated at 14 including a front portion 22, and a back portion 33.

The support structure 11 is provided with a number of legs 15 which are spaced apart by a base table top 16, the upright side partitions 12 and 13 being secured to the support structure at opposing sides thereof. The base table top serves as an instrument panel as best shown in FIGURES 3 and 4. The support structure 11 includes a rear wall 17 shown in FIGURE 5 to which the foldable table top 14 is hinged as by a hinge 44. The front and back portions 22 and 33 of the foldable table top 14 are hinged to each other as by means of a hinge 18.

When the foldable table top 14 is closed as shown in FIGURE 5, there is defined an instrument enclosure 19 within which are disposed certain instrumentalities, for example a phonograph 66 and the controls or control panel 77 of an amplifier.

Figure 8:
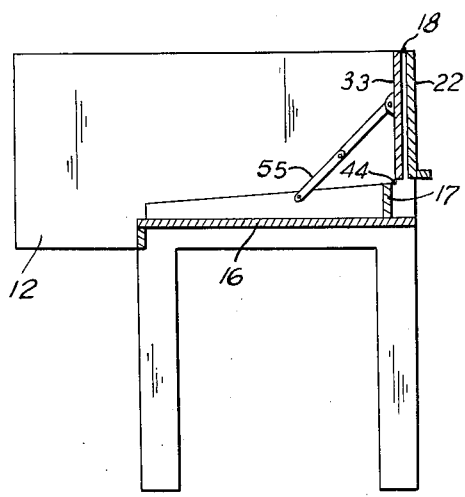
FIGURE 8 is a cross-sectional view taken along line VIII—VIII of FIGURE 3.

When the foldable table top 14 is hinged about the hinges 18 and 44 to the position shown in FIGURE 8, the table top 14 is held in such vertical position to define a front partition as by means of a collapsible hinged brace 55. When the foldable table top 14 is so disposed, it coacts with the lateral sides or partitions 12 and 13 to define a three-sided partially-collapsible acoustic enclosure, the foldable table top 14 thus defining a movable solid acoustical wall. When the structure is so arranged, the device is converted to a language booth.

The back portion 33 of the desk top 14 together with the front portion 22 is now in an upright position, forming a solid acoustical wall. It should be noted that with several desks standing side by side there is always a double wall between students. The walls are separated by a small air space. The same is true with the double front wall. All three walls surrounding the student form an effective acoustic barrier and impede the transmission of sound from one booth to the adjacent one. The folding table top 14 does not only serve as a sound barrier when it is in its upright position but it covers the recorder, microphone, and earphones when the desk is used in the classroom. Thus no extra storage space is needed for microphone and earphones.

The dotted lines on the left side partition 12 indicate how it is possible to obtain still more acoustical separation by increasing the height of the side walls. The increase in height is achieved by providing another foldable feature. Swinging the panel 12a to its upper position and securing it in that position by a bolt increases the wall height. The panel 12a is shown in its folded down position (classroom) and in the dashed lines in its folded up position (language laboratory).

When several desks are placed side by side, as is usual in a laboratory, it is not always necessary to have two side walls adjacent to each other. In such cases each desk has only one side wall. Only the last desk in a row is equipped with two side walls.

Figure 6:
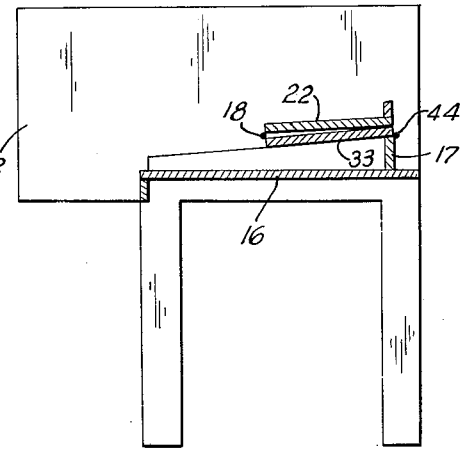
FIGURE 6 is a cross-sectional view taken along line VI—VI of FIGURE 2.

FIG. 5 shows the position of the foldable top 14 when used in ordinary classroom. Hinge 18 serves for folding the front portion 22 back 180 degrees onto the back portion 33 (see FIG. 6). Hinge 44 serves to fold the back portion 33 thru an angle of substantially 90 degrees (see FIG. 8). To support back portion 33 (FIG. 8) in an upright position a hinged brace 55 is used.

Figure 7:
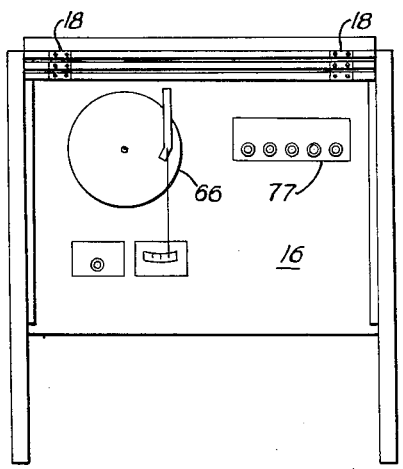
FIGURE 7 is a top plan view of the desk arranged as shown in FIGURE 3.

FIG. 7 is a plan view of the desk as used for language instruction. The phonograph 66 may be a disk recorder or a tape recorder. The control panel 77 is part of the amplifier (not shown in the figure).

We claim:

1. A convertible classroom desk comprising a support structure, a base table top mounted on said support structure for mounting and storing instruments, two upright partitions fastened to two opposing sides of said support structure, a table top hingedly mounted to said support structure, said table top including a front portion and a rear portion which are hinged together, said front portion being operable to be folded back about the hinge axis onto the rear portion of said table top, said table top being convertible between at least first and second positions, said first position being such that said table top covers and prevents access to said base table top and said second position being such that said table top is tilted upwardly and forms with said two upright partitions a sound-absorbing booth.

2. A convertible classroom desk that can be used as either a classroom desk or a sound absorbing booth comprising a support structure, a base table top mounted on said support structure for mounting and storing instruments, two upright partitions fastened to two opposing sides of said support structure, a table top hingedly mounted to said support structure, said table top including front and rear portions which are hinged together, said front portion being operable to be folded back about the hinge axis onto the rear portion of said table top, said table top being convertible between at least first and second positions, said first position being such that said table top covers and prevents access to the instruments stored in the base table top and said second position being such that said front portion is folded about the hinge axis onto said rear portion and said table top is tilted upwardly and forms with said two upright partitions a sound-absorbing booth, the inner surfaces of said two upright partitions and said table top being of a sound absorbing material.

3. A class room desk that is convertible between a sound absorbing booth and a conventional desk comprising a support structure, a base table top mounted on said support structure for mounting and storing instruments, two upright partitions fastened to two opposing sides of said support structure, a table top hingedly mounted to said support structure, said table top including front and rear portions which are hinged together, said front portion being operable to be folded back about the hinge axis onto the rear portion of said table top, said table top being convertible between at least first and second positions, said first position being such that said table top covers and prevents access to the instruments in said base table top and said second position being such that said front portion is folded back onto said rear portion and said table top is tilted upwardly, brace means for holding said table top in said second position, said two partitions and said table top having a sound absorbing material thereon, the structure being such that when a plurality of the convertible classroom desks are lined up in a row with said table tops in said second position, there are two walls and an air space separating the students on three sides of the desks which increases the sound absorbing characteristics of the apparatus.

References Cited in the file of this patent

UNITED STATES PATENTS

| | | |
|---|---|---|
| 39,952 | Perot | Sept. 15, 1863 |
| 1,269,084 | Hussey | June 11, 1918 |
| 1,272,245 | Fitzgerald | July 9, 1918 |
| 1,299,331 | Gydesen | Apr. 1, 1919 |
| 1,692,665 | Knaster | Nov. 20, 1928 |
| 2,332,760 | Smallen | Oct. 26, 1943 |
| 2,673,132 | Alderman | Mar. 23, 1954 |
| 2,804,933 | Imhof | Sept. 3, 1957 |
| 2,836,968 | Ferris | June 3, 1958 |

OTHER REFERENCES

Washington Post publication, "Electronic Language Teaching System Starts at G.U.," dated Nov. 22, 1950.